United States Patent
Ma et al.

(10) Patent No.: US 12,552,321 B2
(45) Date of Patent: Feb. 17, 2026

(54) CAMERA MONITOR SYSTEM UTILIZING TRAILER ANGLE DETECTION BASED UPON DOT TAPE

(71) Applicant: STONERIDGE, INC., Novi, MI (US)

(72) Inventors: Liang Ma, Rochester, MI (US); Mohammad Gudarzi, Wixom, MI (US); Aminul Hoque, Novi, MI (US)

(73) Assignee: STONERIDGE, INC., Novi, MI (US)

(*) Notice: Subject to any disclaimer, the term of this patent is extended or adjusted under 35 U.S.C. 154(b) by 189 days.

(21) Appl. No.: 18/367,174

(22) Filed: Sep. 12, 2023

(65) Prior Publication Data

US 2025/0083602 A1    Mar. 13, 2025

(51) Int. Cl.
| | |
|---|---|
| *B60R 1/27* | (2022.01) |
| *B60R 1/12* | (2006.01) |
| *B62D 63/08* | (2006.01) |
| *G01B 11/27* | (2006.01) |

(52) U.S. Cl.
CPC .............. *B60R 1/27* (2022.01); *B62D 63/08* (2013.01); *G01B 11/272* (2013.01); *B60R 2001/1253* (2013.01); *B60R 2300/105* (2013.01); *B60R 2300/207* (2013.01)

(58) Field of Classification Search
None
See application file for complete search history.

(56) References Cited

U.S. PATENT DOCUMENTS

| | | | |
|---|---|---|---|
| 9,566,911 B2 | 2/2017 | Greenwood et al. | |
| 10,391,939 B2 | 8/2019 | Naserian et al. | |
| 11,429,099 B2 | 8/2022 | Smith et al. | |
| 2008/0231701 A1* | 9/2008 | Greenwood | G08G 1/167 348/148 |
| 2014/0200759 A1* | 7/2014 | Lu | G06T 7/73 701/28 |
| 2017/0217368 A1* | 8/2017 | Lewis | H04N 7/183 |
| 2020/0285913 A1* | 9/2020 | Gavrilovic | G05B 13/027 |
| 2021/0170821 A1* | 6/2021 | Staudacher | B62D 15/0285 |
| 2021/0178984 A1 | 6/2021 | Goth et al. | |
| 2021/0370912 A1* | 12/2021 | Yamamoto | H04N 7/18 |
| 2022/0185371 A1* | 6/2022 | Persson | B62D 12/00 |
| 2022/0274644 A1* | 9/2022 | Johansson | B60W 30/18036 |
| 2023/0215183 A1* | 7/2023 | Bahramgiri | B60D 1/62 382/104 |

FOREIGN PATENT DOCUMENTS

DE    102021204625 A1    11/2022

\* cited by examiner

*Primary Examiner* — Rebecca A Volentine
(74) *Attorney, Agent, or Firm* — Carlson, Gaskey & Olds, P.C.

(57) ABSTRACT

A method of operating a camera monitor system (CMS) includes capturing an image that encompasses a trailer with Department of Transportation (DOT) tape, identifying the DOT tape, determining a line that is formed by the DOT tape, calculating a line angle from the line, and ascertaining a trailer angle from the line angle.

20 Claims, 6 Drawing Sheets

CAMERA MONITOR SYSTEM UTILIZING TRAILER ANGLE DETECTION BASED UPON DOT TAPE

TECHNICAL FIELD

This disclosure relates to a camera monitor system (CMS) for a vehicle, and specifically to a system and a process for determining trailer angle detection based upon Department of Transportation (DOT) tape.

BACKGROUND

Mirror replacement systems, and camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the camera systems cover a larger field of view than a conventional mirror, or include views that are not fully obtainable via a conventional mirror.

In addition to mirror replacement, the images provided via the cameras in the CMS can be utilized to detect aspects of the environment and aspects of the vehicle in an image-processing-based detection process. It is desirable to determine a trailer angle between the trailer and the tractor from which it is secured to provide a variety of functionalities. For example, a trailer angle may be used to provide a panning feature in which a trailer rear edge remains in view during various turning maneuvers to provide improved visibility to the driver. Other functionalities include attentive driving detection, automated driving features, semi-automated driver assist features, jackknife warnings, and any similar elements.

Accurate detection of trailer angle using image-processing-based perception can be one important features of the tractor-trailer systems described above. However, the image-processing-based perception is computationally intensive, so it is desirable to determine the trailer angle efficiently and effectively.

SUMMARY OF THE INVENTION

In one exemplary embodiment, a method of operating a camera monitor system (CMS), includes capturing an image that encompasses a trailer with Department of Transportation (DOT) tape, identifying the DOT tape, determining a line that is formed by the DOT tape, calculating a line angle from the line, and ascertaining a trailer angle from the line angle.

In a further embodiment of any of the above, the method includes a step of identifying a region of interest in the image of a greatest likelihood of containing the DOT tape, and the color filter applying step is performed in the region of interest.

In a further embodiment of any of the above, the DOT tape is provided by alternating red and white that is arranged in a horizontal direction, and the identifying step includes applying a color filter to the image to locate pixels that are at least one of red and/or white.

In a further embodiment of any of the above, the identifying step is performed by pattern recognition.

In a further embodiment of any of the above, the identifying step is performed by least square fitting.

In a further embodiment of any of the above, the image is a 2-dimensional (2D) image, and the calculating step is performed with the 2D image, and the ascertaining step included calculating the trailer angle in 3-dimensions.

In a further embodiment of any of the above, the trailer angle corresponds to a DOT-based trailer angle, and includes another trailer angle, referencing the DOT-based trailer angle relative to the other trailer angle to arrive at a final trailer angle.

In a further embodiment of any of the above, the other trailer angle is determined based upon a trailer wheel identification.

In a further embodiment of any of the above, the other trailer angle is determined based upon a trailer edge detection.

In a further embodiment of any of the above, the trailer edge detection includes a trailer horizontal edge detection.

In a further embodiment of any of the above, the trailer edge detection includes a trailer vertical edge detection.

In a further embodiment of any of the above, the other trailer angle has a probability, and the referencing step includes utilizing the DOT-based trailer angle instead of the other trailer angle when the probability is below a probability threshold.

In a further embodiment of any of the above, the method includes a step of displaying at least a portion of the image.

In a further embodiment of any of the above, the method includes a step of modifying the displayed image based upon the trailer angle.

In a further embodiment of any of the above, the modifying step includes panning the displayed image.

In a further embodiment of any of the above, the modifying step includes providing an object detection awareness indicator.

In a further embodiment of any of the above, the providing step includes altering a previously displayed object detection awareness indicator.

In another exemplary embodiment, a camera monitor system (CMS) includes a camera that is configured to capture an image. The image is configured to encompass a trailer with Department of Transportation (DOT) tape. A display is configured to display at least a portion of the image. A controller is in communication with the camera and the display. The controller is configured to apply a color filter to the image to locate pixels that are at least one of red and/or white, identify the DOT tape from the pixels, determine a line that is formed by the DOT tape, calculate a line angle from the line, and ascertaining a trailer angle from the line angle. The controller is configured to provide the portion to the display based upon the trailer angle.

In a further embodiment of any of the above, the controller is configured to modify the displayed portion based upon the trailer angle by panning the displayed image.

In a further embodiment of any of the above, the controller is configured to modify the displayed portion based upon the trailer angle by altering a previously displayed object detection awareness indicator.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
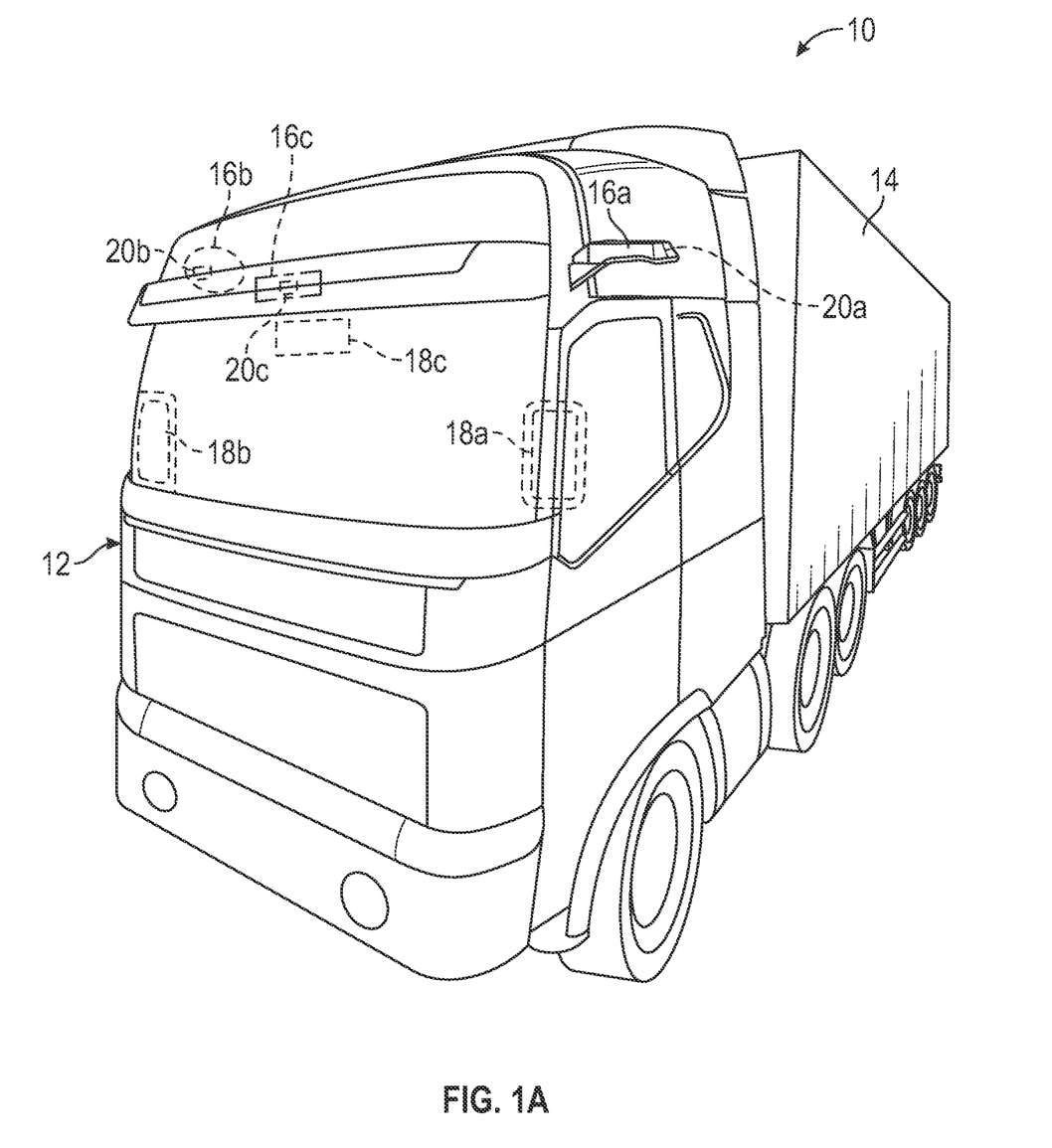
FIG. 1A is a schematic front view of a commercial truck with a camera monitor system (CMS) used to provide at least Class II and Class IV views.
Figure 1B:
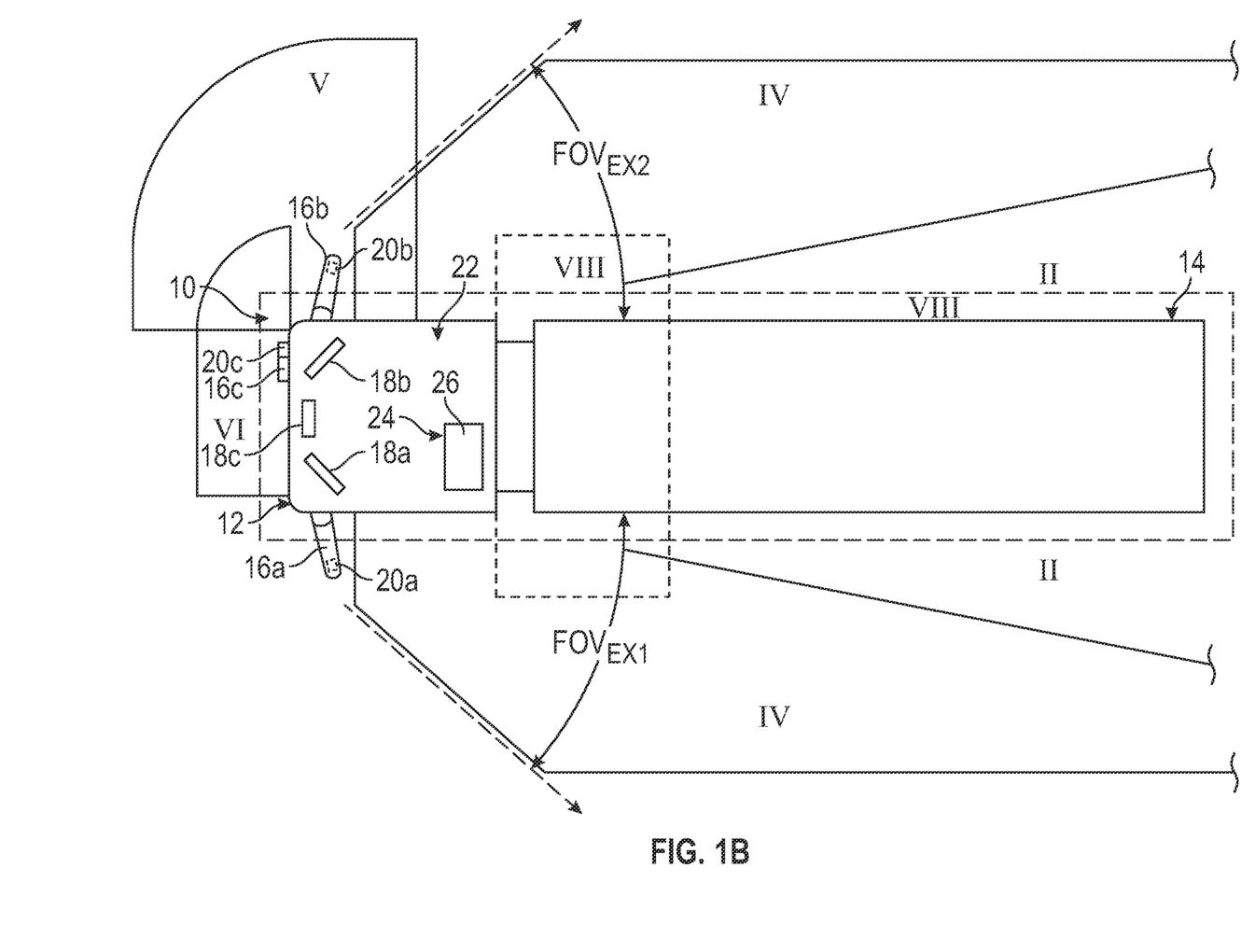
FIG. 1B is a schematic top elevational view of a commercial truck with a camera monitor system providing Class II, Class IV, Class V and Class VI views.
Figure 2:
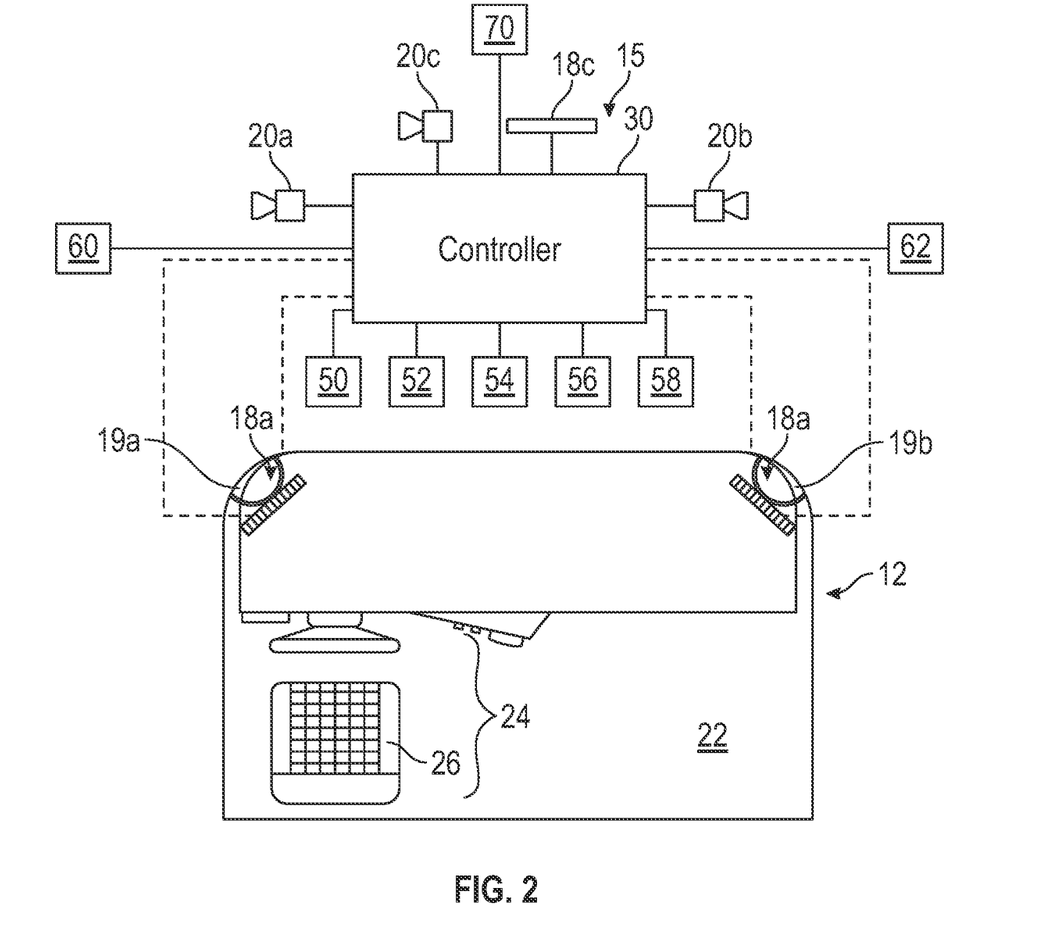
FIG. 2 is a schematic top perspective view of an vehicle cabin including displays and interior cameras.
Figure 3A:
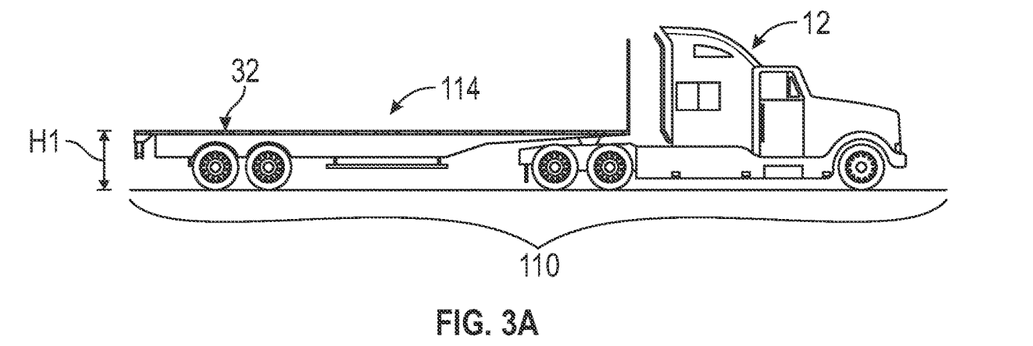
FIGS. 3A-3C illustrate various trailer configurations in which Department of Transportation (DOT) tape is provided on the trailer according to example regulations.
Figure 3B:
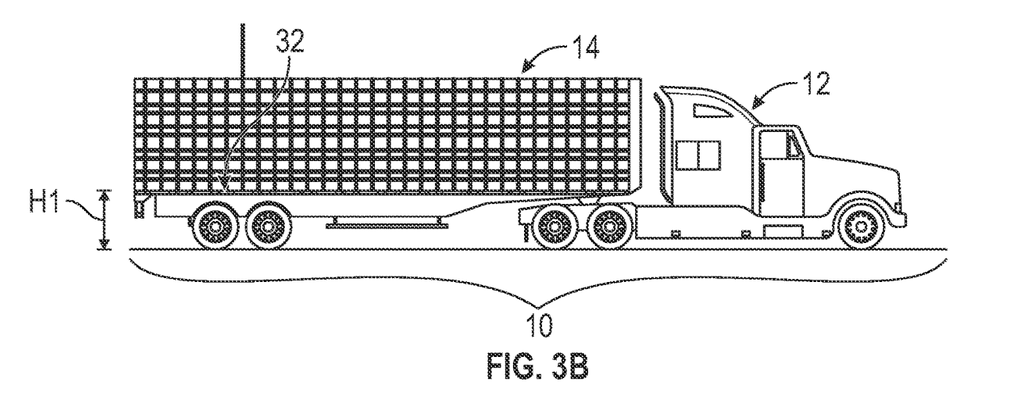
Figure 3C:
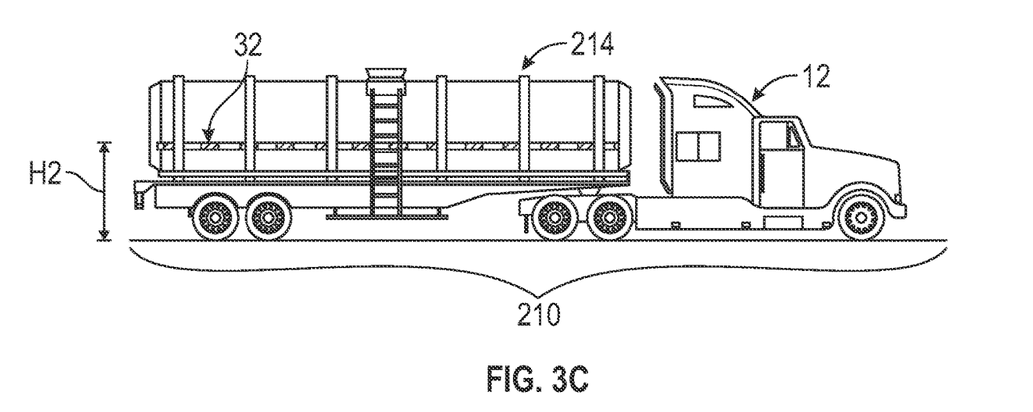

A schematic view of a commercial vehicle 10 is illustrated in FIGS. 1A and 1B. FIG. 2 is a schematic top perspective view of the vehicle 10 cabin including displays and interior cameras. The vehicle 10 includes a vehicle cab or tractor 12 for pulling a trailer 14. It should be understood that the vehicle cab 12 and/or trailer 14 may be any configuration (e.g., vehicles 10, 110, 210; FIGS. 3A-3C). Although a commercial truck is contemplated in this disclosure, the invention may also be applied to other types of vehicles. The vehicle 10 incorporates a camera monitor system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b (generally, "camera arm(s) 16") includes a base that is secured to, for example, the cab 12. A pivoting arm is supported by the base and may articulate relative thereto. At least one rearward facing camera 20a, 20b is arranged respectively within camera arms. The exterior cameras 20a, 20b (generally, "camera(s) 20") respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Class II and Class IV views are defined in European R46 legislation, for example, and the United States and other countries have similar driver visibility requirements for commercial trucks. Any reference to a "Class" view is not intended to be limiting, but is intended as exemplary for the type of view provided to a display by a particular camera. Each arm 16a, 16b may also provide a housing that encloses electronics that are configured to provide various features of the CMS 15.

First and second video displays 18a, 18b (generally, "display(s)") are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and/or Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver. The displays 18a, 18b, 18c face a driver region 24 within the cabin 22 where an operator is seated on a driver seat 26. The location, size and field(s) of view streamed to any particular display may vary from the configurations described in this disclosure and still incorporate the disclosed invention.

If video of Class VIII views is desired, camera housings can be disposed at the sides and rear of the vehicle 10 to provide fields of view including some or all of the Class VIII zones of the vehicle 10. As illustrated, the Class VIII view includes views immediately surrounding the trailer, and in the rear proximity of the vehicle including the rear of the trailer. In one example, a view of the rear proximity of the vehicle is generated by a rear facing camera disposed at the rear of the vehicle, and can include both the immediate rear proximity and a traditional rear view (e.g. a view extending rearward to the horizon, as may be generated by a rear view mirror in vehicles without a trailer). In such examples, the third display 18c can include one or more frames displaying the Class VIII views. Alternatively, additional displays can be added near the first, second and third displays 18a, 18b, 18c and provide a display dedicated to providing a Class VIII view.

A controller 30 is in communication with the displays 18, cameras 20 and various inputs, such as a steering angle sensor 50, gear position sensor 52, vehicle speed sensor 54, trailer angle algorithm 56 and/or other sensor and/or algorithms 58. Specific examples include a wheel detection algorithm 60, a trailer edge detection algorithm 62 and an awareness indicator algorithm 70. Example wheel detection algorithm techniques are disclosed in U.S. application Ser. No. 18/080,031 entitled "CAMERA MONITOR SYSTEM FOR COMMERCIAL VEHICLES INCLUDING WHEEL POSITION ESTIMATION", filed on Dec. 13, 2022 and U.S. Provisional Application Ser. No. 63/405,912 entitled "CAMERA MONITOR SYSTEM FOR COMMERCIAL VEHICLES INCLUDING WHEEL POSITION ESTIMATION", filed on Sep. 13, 2022, both of which are incorporated herein by reference in its entirety. Example trailer edge detection algorithm techniques are disclosed in U.S. application Ser. No. 17/952,459 entitled "TRAILER END TRACKING IN CAMERA MONITORING SYSTEM", filed Sep. 26, 2022 and U.S. Provisional Application Ser. No. 63/405,152 entitled "CAMERA MONITORING SYSTEM INCLUDING TRAILER PRESENCE DETECTION USING OPTICAL FLOW", filed on Sep. 9, 2022, which are incorporated herein by reference in its entirety. Example awareness indicator algorithm techniques are disclosed in Unites States application Ser. No. 18/134,261 entitled "CAMERA MIRROR SYSTEM INCLUDING AUTOMATIC ANGULAR ADJUSTMENT FOR COMMERCIAL VEHICLE DISPLAYS", filed on Apr. 13, 2023 and U.S. application Ser. No. 18/124,646 entitled "DYNAMIC LONGITUDINAL AND LATERAL ADJUSTMENT OF AWARENESS LINES FOR COMMERCIAL VEHICLE CAMERA MIRROR SYSTEM", filed on Mar. 22, 2023, which are incorporated herein by reference in its entirety.

It should be noted that the described controller 30 can be used to implement the various functionality disclosed in this application. The controller 30 may include one or more discrete units.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory. The controller 30 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a printer, display, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 30 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Each camera 20 includes an image capture unit that provides its respective field of view, portion of a field of view or multiple fields of view. The controller 30 (whether in the camera arm 16 and/or the vehicle cab 12) includes one or more video processors that provide a video signal containing images from the image capture unit to the displays 18.

FIGS. 3A-3C illustrate various example trailer configurations for vehicles 10, 110, 210. FIG. 3A illustrates a tractor 12 pulling a trailer 114 having regulation-required Department of Transportation (DOT) tape provided on the tractor 114. Current United States Federal Regulations require trucks exceeding 10,000 pounds gross vehicle weight rating (GVWR) and over 80 inches wide to mark the trailer to improve visibility to motorists and pedestrians. One typical regulation is that each side of the trailer must be marked with a reflective tape that alternates between red and white for at least 50% of the length of the trailer. The tape must be positioned between a height H1 of at least 15 inches from the ground to a height H2 of up to 60 inches from the ground. Typically, a 2 inch height of reflective tape is provided in a 6/6 or 7/11 (inch/inch) repeating pattern. Other aspects of the regulation require DOT tape on other portions of the trailer. Governing regulations may vary by region, jurisdiction and/or country. Accordingly, "DOT tape" as used in this disclosure are intended to encompass not only regulations within the United States and North America, but in any jurisdiction requiring repeatable, defined markings on the sides of the trailer for motorist and pedestrian visibility. The DOT tape is typically reflective for improved nighttime visibility. Therefore, DOT tape is not limited to markings required by law, but also includes markings typically employed in the commercial trucking industry to enhance visibility of the trailer.

As can be seen by the trailers 14, 114 (FIGS. 3A and 3B), the DOT tape 32 is typically provided at a base of cargo-type trailers. For tanker trucks, like the trailer 214 shown in FIG. 3C, the DOT tape 32 is typically arranged at a height closer to the maximum height in the regulation, i.e., closer to the middle of the tank.

Figure 4:
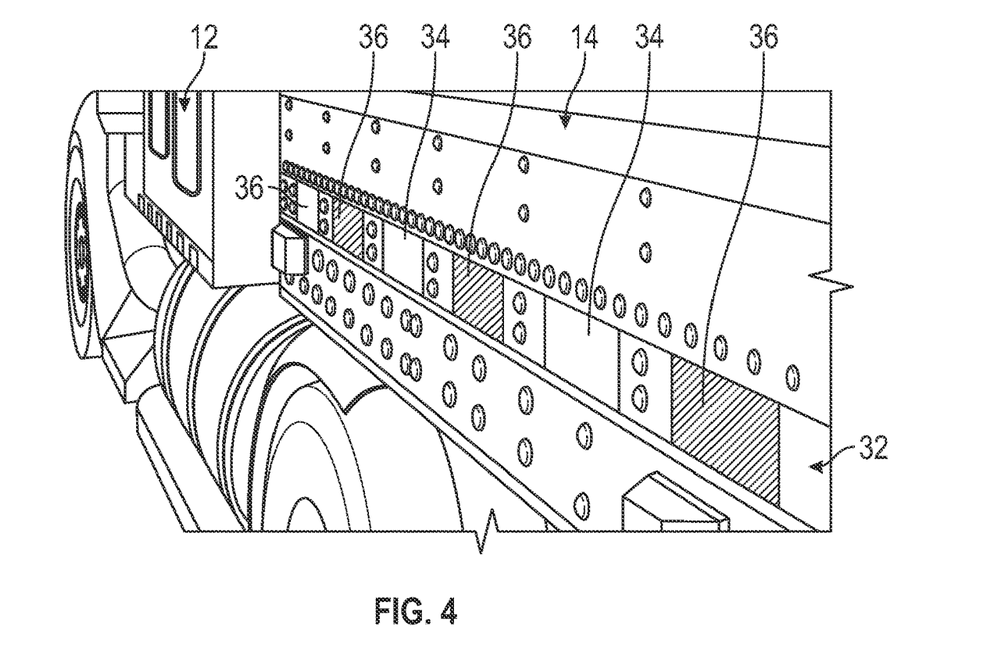
FIG. 4 is an enlarged perspective view of a portion of the trailer illustrating the DOT tape in more detail.

A typical DOT tape 32, as applied to an enclosed cargo truck, shown in FIG. 4, includes a pattern of alternating reflective white 34 and reflective red 36 horizontally arranged rectangles (e.g., 2 inch high 6/6 or 7/11 configuration). One example regulation permits the red and white reflective portions 34, 36 to be separated to accommodate features such as rivets securing the trailer components to one another.

Figure 5:
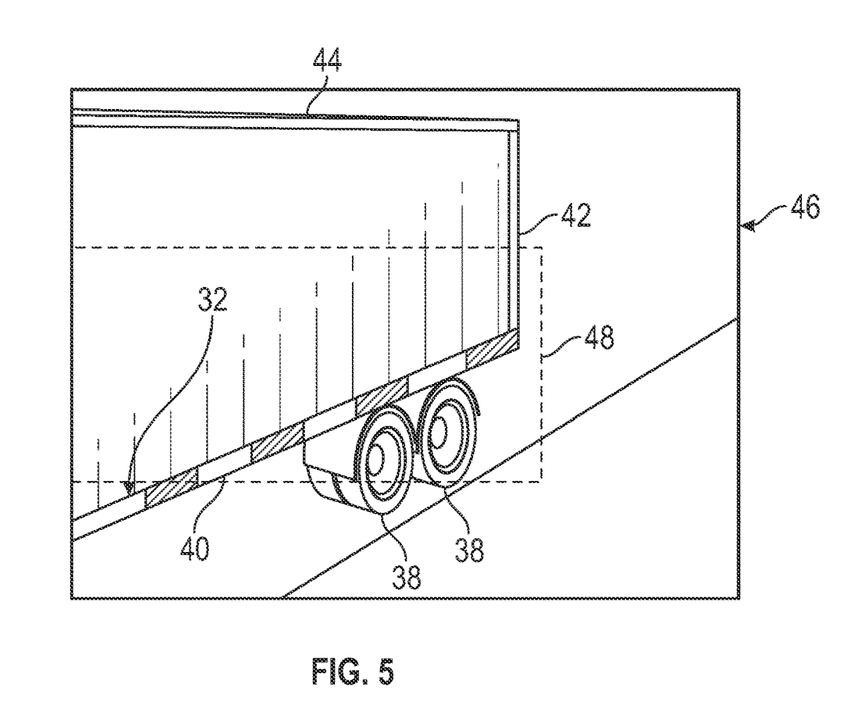
FIG. 5 illustrates a captured image of a portion of the trailer provided by the CMS, with a region of interest illustrated in dashed lines.

The CMS 15 and its cameras 20 are configured to capture an image along each side of the trailer 14. The image is configured to encompass the trailer and its DOT tape 32. In the example shown in FIG. 5, the captured image 46 will typically include a bottom edge 40 of the trailer, its terminal end 42 and/or the top edge 44. Wheels 38 of the trailer's rear axles may also be captured. Since the regulations may require the DOT tape 32 to be present in a specified height range, it may be desirable to use a region of interest (ROI) 48 for limiting video processing of the image to only a portion of the captured image in which the DOT tape 32 is likely to appear in order to reduce image processing time.

Figure 6:
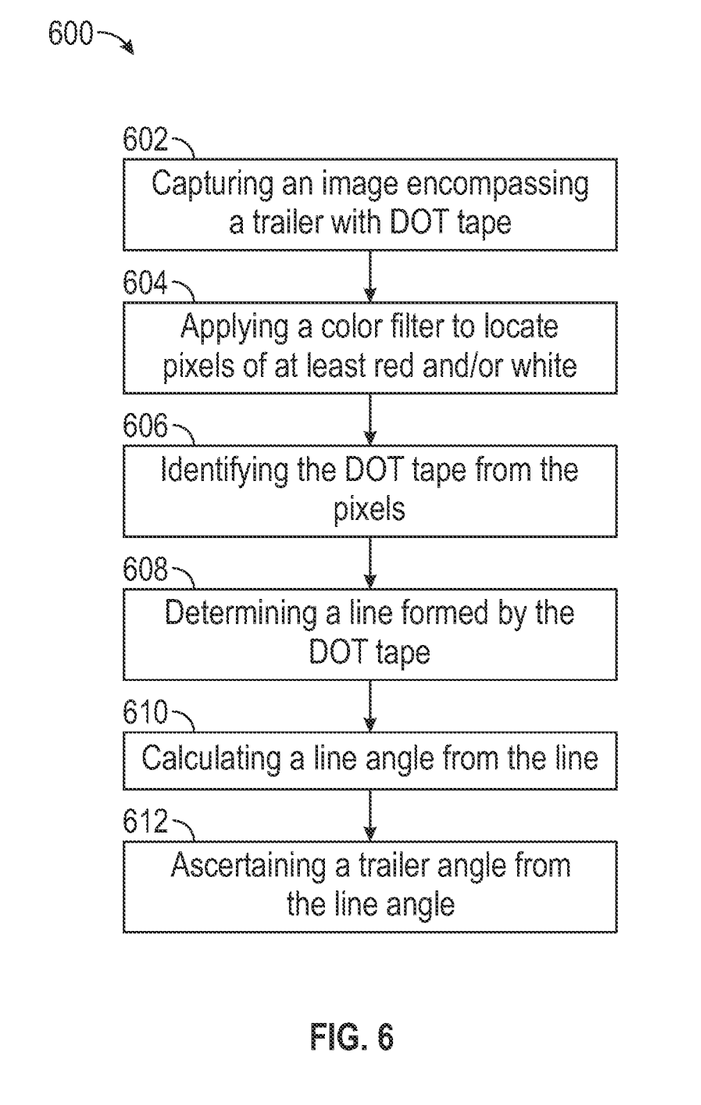
FIG. 6 is an example method of operating the CMS to determine a trailer angle using the DOT tape.

In one example method 600 shown in FIG. 6, the CMS 15 and its controller 30 are configured to capture the image 46 and encompass at least a portion of the trailer 14 with the DOT tape 32 (block 602). To speed image processing, a region of interest 48 may be used in an area having the greatest likelihood of containing the DOT tape 32. In one example approach, the DOT tape is identified, optionally, by applying a color filter to the image 46 (e.g., to the ROI 48) to locate the image pixels that are at least one of red and/or white (block 604), thereby isolating the DOT tape 32 from the rest of the image 46. Using a color filter is efficient and effective. Clustering red pixels and/or white pixels form the shape and location of DOT tape. Other approaches may be used. For example, the identifying step can be performed by pattern recognition, template matching, deep learning, and/or by least square fitting, for example. The DOT tape 32 is identified from the pixels (block 606), and a line formed by the DOT tape 32 can be determined (block 608). In one example, a line is fit from the centers of the red and white clusters.

Using the 2D image provided by the image capture unit, the line angle is calculated from the line (block 610), and the trailer angle is ascertained in 3D space from the line angle (block 612).

In one example, the controller 30 may use the DOT-based trailer angle, as determined above, for the trailer angle 56. Additionally or alternatively, the trailer angle 56 (e.g., final trailer angle used by the CMS 15) may be arrived at by referencing the DOT-based trailer angle relative to another trailer angle. This other trailer angle may be determined by a wheel detection and/or edge detection technique (e.g., trailer horizontal or vertical edge).

The disclosed method can be used to determine the trailer angle for a variety of functionalities, such as panning the displayed image during turning maneuvers in forward and/or reverse. Object detection awareness indicators may also be provided based upon the trailer angle, such as graphical overlays indicating relative closeness or distance to nearby objects.

The disclosed method determining the trailer angle may be used primarily, or instead of and/or in addition to other trailer angle determination methods. For example, if trailer end detection and/or wheel detection is used to determine the trailer angle, the disclosed method may be used as a supplement for when those techniques are not available. In one example, if a trailer angle using another technique has a low probability, the method of determining trailer angle based upon DOT tape may be used instead of the low probability trailer angle.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of operating a camera monitor system (CMS), comprising:
    capturing an image encompassing a side of a trailer with Department of Transportation (DOT) tape;
    identifying the DOT tape;
    determining a line formed by the DOT tape;
    calculating a line angle from the line; and
    ascertaining a trailer angle from the line angle.

2. The method of claim 1, comprising a step of identifying a region of interest in the image of a greatest likelihood of containing the DOT tape, and the identifying step is performed in the region of interest.

3. The method of claim 1, wherein the DOT tape is provided by alternating red and white arranged in a horizontal direction, and the identifying step includes applying a color filter to the image to locate pixels that are at least one of red and/or white.

4. The method of claim 1, wherein the identifying step is performed by pattern recognition.

5. The method of claim 1, wherein the identifying step is performed by least square fitting.

6. The method of claim 1, wherein the image is a 2-dimensional (2D) image, and the calculating step is performed with the 2D image, and the ascertaining step included calculating the trailer angle in 3-dimensions.

7. The method of claim 1, wherein the trailer angle corresponds to a DOT-based trailer angle, and comprising another trailer angle, referencing the DOT-based trailer angle relative to the other trailer angle to arrive at a final trailer angle.

8. The method of claim 7, wherein the other trailer angle is determined based upon a trailer wheel identification.

9. The method of claim 7, wherein the other trailer angle is determined based upon a trailer edge detection.

10. The method of claim 9, wherein the trailer edge detection includes a trailer horizontal edge detection.

11. The method of claim 9, wherein the trailer edge detection includes a trailer vertical edge detection.

12. The method of claim 7, wherein the other trailer angle has a probability, and the referencing step includes utilizing the DOT-based trailer angle instead of the other trailer angle when the probability is below a probability threshold.

13. The method of claim 1, wherein the image capturing step is performed using a rear-facing camera mounted to a side of a vehicle, and comprising a step of displaying at least a portion of the image.

14. The method of claim 13, comprising a step of modifying the displayed image based upon the trailer angle.

15. The method of claim 14, wherein the modifying step includes panning the displayed image.

16. The method of claim 14, wherein the modifying step includes providing an object detection awareness indicator.

17. The method of claim 16, wherein the providing step includes altering a previously displayed object detection awareness indicator.

18. A camera monitor system (CMS) comprising:
    a rear-facing camera mounted to a side of a vehicle and configured to capture an image, the image configured to encompass a side of a trailer with Department of Transportation (DOT) tape;
    a display configured to display at least a portion of the image; and
    a controller in communication with the rear-facing camera and the display, the controller configured to apply a color filter to the image to locate pixels that are at least one of red and/or white, identify the DOT tape from the pixels, determine a line formed by the DOT tape, calculate a line angle from the line, and ascertaining a trailer angle from the line angle, and the controller configured to provide the portion to the display based upon the trailer angle.

19. The CMS of claim 18, wherein the controller is configured to modify the displayed portion based upon the trailer angle by panning the displayed image.

20. The CMS of claim 18, wherein the controller is configured to modify the displayed portion based upon the trailer angle by altering a previously displayed object detection awareness indicator.

* * * * *